(12) United States Patent
Wang et al.

(10) Patent No.: US 7,617,090 B2
(45) Date of Patent: Nov. 10, 2009

(54) CONTENTS FILTER BASED ON THE COMPARISON BETWEEN SIMILARITY OF CONTENT CHARACTER AND CORRELATION OF SUBJECT MATTER

(75) Inventors: Jiang Wang, Beijing (CN); Jianzhong Gao, Beijing (CN); Nan Wang, Beijing (CN); Guang Zhu, Beijing (CN); Hang Xiao, Beijing (CN)

(73) Assignee: Legend (Beijing) Limited, Beijing (CN)

( * ) Notice: Subject to any disclaimer, the term of this patent is extended or adjusted under 35 U.S.C. 154(b) by 1204 days.

(21) Appl. No.: 10/488,731

(22) PCT Filed: May 23, 2002

(86) PCT No.: PCT/CN02/00346

§ 371 (c)(1),
(2), (4) Date: Mar. 5, 2004

(87) PCT Pub. No.: WO03/038667

PCT Pub. Date: May 8, 2003

(65) Prior Publication Data

US 2004/0243537 A1    Dec. 2, 2004

(30) Foreign Application Priority Data

Sep. 7, 2001    (CN)    .............................. 01 1 31420

(51) Int. Cl.
 G06F 17/27    (2006.01)
 G10L 11/00    (2006.01)
(52) U.S. Cl. .................. 704/9; 704/270; 704/270.1
(58) Field of Classification Search .............. None
See application file for complete search history.

(56) References Cited

U.S. PATENT DOCUMENTS

| | | | | |
|---|---|---|---|---|
| 5,996,011 A | * | 11/1999 | Humes | ................. 709/225 |
| 6,014,654 A | | 1/2000 | Ariyoshi | ................. 706/62 |
| 6,092,091 A | | 7/2000 | Sumita et al. | ............ 707/530 |
| 6,233,618 B1 | * | 5/2001 | Shannon | ............... 709/229 |
| 6,493,744 B1 | * | 12/2002 | Emens et al. | ............ 709/203 |

(Continued)

FOREIGN PATENT DOCUMENTS

JP    9190443    7/1997

*Primary Examiner*—David R Hudspeth
*Assistant Examiner*—Brian L Albertalli
(74) *Attorney, Agent, or Firm*—Duane Morris LLP

(57) ABSTRACT

A contents filter based on similarity of content character and correlation of subject matter includes a filtering system and a disciplining system, and the contents filter isn't a filtering system used for a special subject matter but a general subject matter, the filtering contents can be obtained by leaning of the disciplining system, the filtering system and the disciplining system are installed of physical separation, the filtering system communicates with the disciplining system through the data interface, the filtering system can be installed in the input device of network information. To achieve the different filtering effect the different filtering character obtained by the disciplining system are set to the filtering system located in the different input device of network information. The present invention implements filtering through analyzing and determining text contents, and offers an intelligent and effective service of contents safety for user. The use of the filter is in great agility. Furthermore the filter can identify the contents character to be filtered according to the character with disciplined class provided by user. The processing speed is fast and the filter can be conveniently installed.

41 Claims, 5 Drawing Sheets

U.S. PATENT DOCUMENTS 6,633,855 B1 * 10/2003 Auvenshine ................. 706/15
6,675,162 B1 * 1/2004 Russell-Falla et al. ......... 707/5
2003/0009495 A1 * 1/2003 Adjaoute ................. 707/501.1

* cited by examiner

CONTENTS FILTER BASED ON THE COMPARISON BETWEEN SIMILARITY OF CONTENT CHARACTER AND CORRELATION OF SUBJECT MATTER

FIELD OF THE INVENTION

The present invention relates to a kind of filter system of text contents information in the field of Chinese information processing, and particularly relates to a filter of text character analysis based on similarity of contents and correlation of subject matter, it belongs to the field of computer information technology.

BACKGROUND OF THE INVENTION

The rapid development of computer and network technology and the popularization of Internet have made network an important approach of getting information for people.

The information on network is much great, some unhealthy contents and information which are not desired are increasing, and all these bring bad effect and heavy economic burden. At present, the problem of the youth contacting with unhealthy contents through Internet has attracted highly regard of all circles in society. On the other hand, some information related to the stability of society and the violation of morality also influence the normal social livings, so filtering the network information is the necessary one of major effective means of preventing the spread of a mass of information violating the social public interest.

Now the principle of some existed network information contents filter is the method based on key words matching. The method has a great effect of filtering on the contents directly exist and without disguise in the information. But the method based on key words matching will not function properly on treated contents or contents with interfering information. It is an obvious limitation that the traditional method based on key words matching has.

To make up the rigescence and limitation of the method based on key words matching, there are some methods which extracts the filtering character through disciplining, then transmits the filtering character to the filtering system as filtering rule, the advantage of this method is that it overcomes the shortcoming of the method based on key words matching in unsuitability for information with interferential information.

But the device using this method is fixing the disciplining system and the filtering system together, the disadvantage is as follows: Because each parameter used for filtering is generated by the disciplining system, the disciplining system generally is large and powerful, while for the sake of flexibility, the filtering system is small to setup in kinds of systems. The prior art of bounding the disciplining system and the filtering system together affects the flexibility of the filtering system, and at the same time restrains the mighty power of the disciplining system.

SUMMARY OF THE INVENTION

The main object of the present invention is to provide a contents filter based on similarity of content character and correlation of subject matter. This contents filter is made more flexible on analysis and determination of text contents by separating the disciplining system and the filtering system and offers an intelligent and effective service of contents safety for users.

Another object of the present invention is to provide a contents filter based on similarity of content character and correlation of subject matter. The contents filter isn't a filtering system used for a specified subject matter but a general subject matter. The content filter can be obtained by learning and can be more flexible for users using the filter.

Another object of the present invention is to provide a contents filter based on similarity of content character and correlation of subject matter, the filter identifies the content character to be filtered according to the character of disciplined class supplied by user, the contents will be filtered if the similarity of content character is beyond the preset threshold value.

Another object of the present invention is to provide a contents filter based on similarity of content character and correlation of subject matter, the processing speed of the filter is fast and the filter can be conveniently installed.

The objects of the present invention are accomplished as follows:

A contents filter based on similarity of content character and correlation of subject matter includes a filtering system and a disciplining system at least; the disciplining system learns with the appointed information to obtain the filtering character of the information; the filtering system filters the information, and the disciplining system communicates with the filtering system.

The contents filter includes one disciplining system and one or more filtering systems; of course the contents filter can include one filtering system and one or more disciplining systems; the contents filter also can include more filtering systems and more disciplining systems.

The filtering system and the disciplining system are installed separately in physics. The filtering system communicates with the disciplining system through the data interface and the said filtering system can be set in an input device of network information.

For further enhancement of filtering effect for different targets, the different information obtained by the disciplining system is configured to the filtering systems in the different input devices of network information respectively.

The mentioned configuration means that the disciplining system distributes the filtering character of the filtering system according to the burden capacity, the location and the purpose of the input devices of network information in network; the input device of networking information is firewall or mail server or proxy server or personal computer; and can also be one input device of network information or more input devices of network information or the combination of any type of input device of network information.

In detail, the disciplining system includes a module of classifying character vocabulary for contents filtering, which is used to construct a classifying character vocabulary learned from the specified information, and conduct the supplement or update of the classifying character vocabulary. The classifying character vocabulary is obtained from the specified learning information by the module of classifying character vocabulary for contents filtering, once the vocabulary is constructed, the disciplining system will transfer the vocabulary contents to the filtering system through the standard data interface, then the filtering system follows the vocabulary to perform the filtering action, and accordingly implements the instruction to the filtering system's action.

The disciplining system further includes an anti-interference extracting module of text character for contents filtering. The said anti-interference extracting module of text character for contents filtering is used to examine and obtain the interferential text in the checked information, and then instruct the actions of text filtering of the filtering system. At first this module finds the specified text information in the checked text contents to check whether the sequence of the specified text contents accord with the sequence of the preset text; then determines the interferential distance between the specified text information and the checked text contents, if the distance is less than the preset threshold distance, the text contents are set as the interferential text contents to be selected.

The disciplining system further includes an anti-interference extracting module of text subject matter; the procedure of extracting the anti-interference subject matter words includes the steps as follows:

Step 1: The anti-interference extracting module of text subject matter examines the specified character in the checked text, to determine whether the sequence of the specified character accords with the sequence of the preset character in the preset subject matter words, i.e. finding the specified character string;

Step 2: The anti-interference extracting module of text subject matter determines the interferential distance, if the interferential distance is less than the preset threshold distance, the string is considered as the interferential subject matter words to be selected;

Step 3: While the anti-interference extracting module of text subject matter concludes that the frequency of appearance of the mentioned subject matter words is beyond the preset threshold value, the subject matter words to be selected are set to the key words of the filter.

The process of the specified character being examined by the anti-interference extracting module of text subject matter further includes finding whether the specified characters contain Chinese punctuations among them, if the specified characters don't contain Chinese punctuations, the character string is the interferential subject matter words, the anti-interference extracting module of text subject matter will consider the character string as the key words of the filter.

The said anti-interference extracting module of text subject matter can examine the specified character string between two adjacent punctuations.

In detail, the frequency of appearance of the interferential subject matter word to be selected can be a summation of the interferential subject matter words of more different types.

The anti-interference extracting module of text subject matter is used to extract the information relating to text subject matter and then the extracted information are rectified, finally the similarity of text based on the Vector Space Model is rectified according to the rectified result of the subject matter information.

The process of rectifying the similarity of text based on the Vector Space Model according to the rectified result of the subject matter information includes the steps as follows:

Extracting the information relating to subject matter of text, in detail extracting the frequency of word, the concentration of frequency, the information of word length, the words and the total words amount; choosing the information relating to subject matter with top weight as the information relating to subject matter; rectifying the extracted information relating to subject matter, then the similarity of text based on the Vector Space Model is rectified according to the rectified result.

The extracting of the subject matter information by the anti-interference extracting module of text subject matter is performed with the formula as follows:

$$w_{ik} = \left(K_1 + \frac{K_1 \times tf}{MAXtf}\right)^{①} \times \frac{1}{\log_2 \frac{T_w}{tf}}^{②} \times \left(K_2 + K_2 \times \frac{w_i}{MAXw_i}\right)^{③},$$

in which, □ stands for the factor of the frequency of word; □ stands for the factor of the concentration of frequency; □ stands for the factor of word length, $W_{ik}$ stands for the weight of the word in text i; tf stands for the frequency of the word k in text i; MAXtf stands for the word frequency of the word with maximum frequency; $K_1$ stands for the grade of importance to tf, commonly set to 0.5; $MAX_{wi}$ stands for the maximum value of the word length in the text; $K_2$ stands for the grade of importance to $w_i$, commonly set to 0.5; $T_w$ stands for the amount of total words (considering the character words only).

Rectifying the extracted information relating to subject matter is to determine the similarity of contents according to the degree of overlapping of subject matter information.

The rectification of the similarity of text based on the Vector Space Model is as follows: if the degree of overlapping is more than the threshold value, the value of eigenvector similarity will be strengthened, and if the degree of overlapping is less than the threshold value, the value of eigenvector similarity will be weakened.

The rectification of the information relating to subject matter is performed according to the following:

$$R_{is} = A + \frac{T_{is} \cap C_s}{C_s},$$

wherein A is an experiential value reflecting the degree of paid importance to the subject matter word (0<A<1), $R_{is}$ is a correlation coefficient of the subject matter word; $T_{is}$ is the subject matter words amount of the text to be analyzed; $C_s$ is the subject matter words amount of standard class. "∩" stands for calculation of intersection.

The rectification of the similarity of text based on the Vector Space Model is as follows:

$$\text{Sim}(w_i, v_j) \times R_{is},$$

in which, $\text{Sim}(w_i, v_j)$ is the similarity of text based on the Vector Space Model.

In addition, the distinguished character of the present invention is that the disciplining system further includes an evaluation and instruction module of disciplining effect.

The evaluation and instruction module of disciplining effect is used to obtain the coefficients of evaluation of character words amount, the evaluation of rate of repeat and the evaluation of degree of subject matter centralization, then according to these coefficients, the result of disciplining effect is educed to give an objective and quantitative instruction to disciplining.

The evaluation of the character words amount is as follows:

$$Q_1 = \begin{cases} 1 & \text{when } x_i < \alpha_i \\ \frac{A - x_i}{A - \alpha_i} & \text{when } x_i > \alpha_i \end{cases},$$

in which, $x_i$ stands for the character words in text of disciplining, A stands for the total amount of the character words, $\alpha_i$ is an experiential threshold value of the character words amount for each disciplining evaluation point.

The evaluation of the rate of repeat is as follows:

$$Q_2 = \begin{cases} x_i/\beta & \text{when } x_i < \beta \\ 1 & \text{when } x_i > \beta \end{cases},$$

in which, $x_i$ stands for the mean rate of repeat, $\beta$ is an experiential threshold value.

The evaluation of the degree of subject matter centralization is as follows:

$$Q_3 = \begin{cases} x_i/\chi & \text{when } x_i < \chi \\ 1 & \text{when } x_i > \chi \end{cases}$$

in which, $x_i$ stands for the maximum overlapping rate of document, $\chi$ is an experiential threshold value.

The evaluation of disciplining finally is as follows:

$$Q = Q1*Q2*Q3 \text{ or } Q = Q1*Q2 \text{ or } Q = Q1*Q3 \text{ or}$$

$$Q = Q2*Q3 \text{ or } Q = Q1 \text{ or } Q = Q2 \text{ or } Q = Q3.$$

Then according to the value of Q, the grade of disciplining effect is determined.

In addition, the filtering system includes a module of classifying character vocabulary for contents filtering, an anti-interference extracting module of text character, and a module of calculating similarity between text contents to be filtered and defined filtering contents. In addition, the filtering system further includes a module of rectifying local similarity and short text similarity with precision.

The module of rectifying local similarity and short text similarity with precision is used to obtain precision of relegation of standard class which text to be analyzed belongs to according to the standard vector of text to be analyzed, and rectify the result of the similarity of text based on the Vector Space Model with the said precision.

The method of rectification can be $\text{Sim}(w_i, v_j) \times P_i$, in which, $P_i$ stands for the rectifying coefficient of precision.

The method of obtaining the rectifying coefficient of precision is described as follows:

$$P_i = B\sqrt{\frac{\Sigma(\sigma_k v_{jk})^2}{\Sigma(v_{jk})^2}}$$

in which $B \geq 1$ and $$\sigma_k = \begin{cases} 1 & \text{when } w_{jk} > 0 \\ 0 & \text{when } w_{jk} = 0 \end{cases}$$

and B is an experienced value of the grade of importance to the precision information.

The filtering system includes a filtering module according to multi-step rectified degree of similarity, which is used to gather the coefficients of precision obtained by each module. With the preset filtering threshold value $U_w$ to determine whether the text to be filtered should be filtered.

The present invention implements the contents filtering through analyzing and determining text contents, and offers an intelligent and effective service of contents safety. The contents filter isn't a filtering system used for a specified subject matter but a general subject matter, and the filtering contents can be obtained by learning. The present invention is also more flexible for user using the filter. Besides, the filter can identify the character of the contents to be filtered with the character of disciplined class, if the similarity of character is beyond the threshold value, the contents will be filtered, its processing speed is fast and the filter can be conveniently installed.

DETAILED DESCRIPTION OF THE INVENTION

The contents filter based on similarity of content character and correlation of subject matter of the present invention implements the contents filtering through an analysis and determination of text contents, and offers an intelligent and effective service of contents safety.

Figure 1:
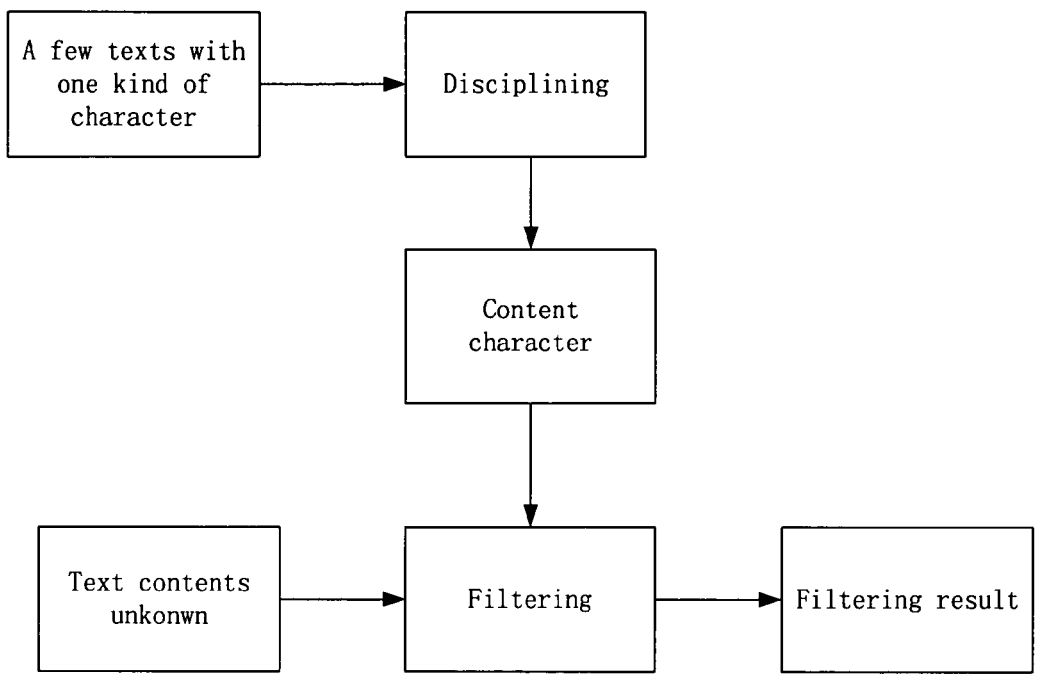
FIG. 1 is a schematic diagram showing the structure of the disciplining system and the filtering system of the present invention.

As shown in FIG. 1, the distinguished character in the present invention is that it provides a notional model of disciplining-filtering system construction.

Universal and unrestrictive text contents are filtered by the contents filter. When making a filtering request for the similar texts with specified contents, at first user makes the filter obtain relative knowledge of the specified contents through learning and then delivers the knowledge to the filter which use it to filter. "disciplining" means the procedure of automatic learning. The filter identifies the character of the contents to be filtered with disciplined classifying character which is offered by user. If the similarity of content character is beyond the preset threshold value, the contents will be filtered.

The notional model of disciplining-filtering system can implement that the contents to be filter are open for user, which make the contents filter a universal filtering system that is not for a specified subject matter.

The mentioned contents filter includes a filtering system and a disciplining system; the disciplining system learns with preset information, and then obtains the filtering character of the information, the filtering system filters the information and the disciplining system communicates with the filtering system. In the present embodiment, the contents filter includes more filtering systems and more disciplining systems. In fact, the contents filter further can include only one disciplining system and one or more filtering systems, or one filtering system and one or more disciplining systems. No matter what the number of the filtering systems and the disciplining systems is set, the filtering system and the disciplining system are set separately in physics.

The filtering system is set in the input device of network information, and the different filtering character obtained by the disciplining system is configured to the filtering systems in the different input devices of network information. The said configuration means that the disciplining system distributes the filtering character of the filtering system according to the burden capacity, the location and the purpose of the input device of network information in network The input device of network information can be firewall or mail server or proxy server or personal computer; and can also be one or more input devices of network information or the combination of any type of input device of network information.

The disciplining system includes a module of classifying character vocabulary for contents filtering, which is used to construct a classifying character vocabulary learned from the specified information, and conduct the supplement or update of the classifying character vocabulary. The classifying character vocabulary is obtained from the specified learning information by the module of classifying character vocabulary. Once the vocabulary is constructed, the disciplining system will transfer the vocabulary contents to the filtering system through the standard data interface, and then the filtering system follows the vocabulary to perform the filtering action, accordingly implements the instruction to the filtering system's action.

The disciplining system further includes an anti-interference extracting module of text character for contents filtering, which is used to examine the checked information and obtain the interferential text in the checked information and instruct the actions of text filtering of the filtering system. At first this module finds the specified text information in the checked text to determine whether the sequence of the specified text contents accord with the sequence of the preset text; then determines the interferential distance between the specified text information and the checked text contents, if the distance is less than the preset threshold distance, the text contents are set as the interferential text contents to be selected.

Figure 2:
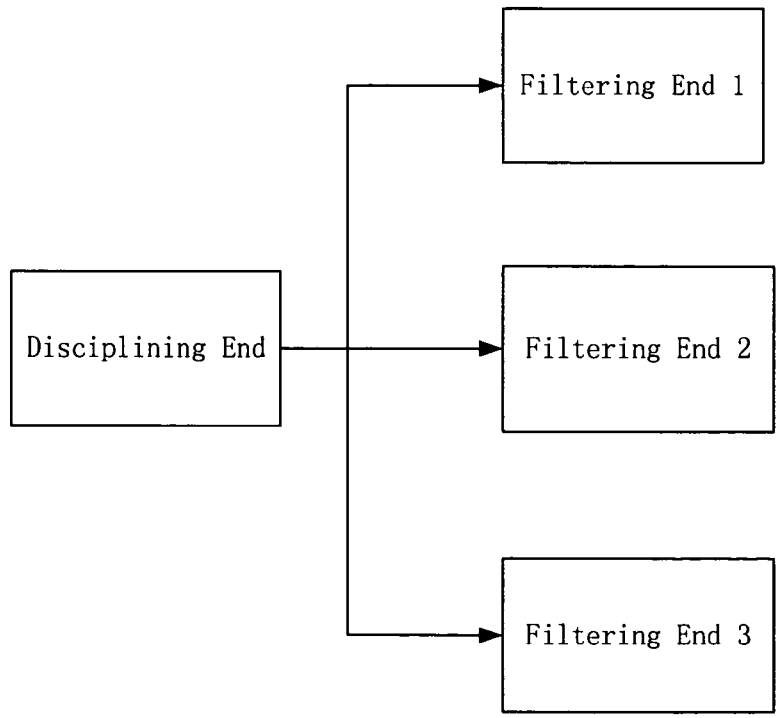
FIG. 2 is a schematic diagram showing one embodiment of the present invention.
Figure 3:
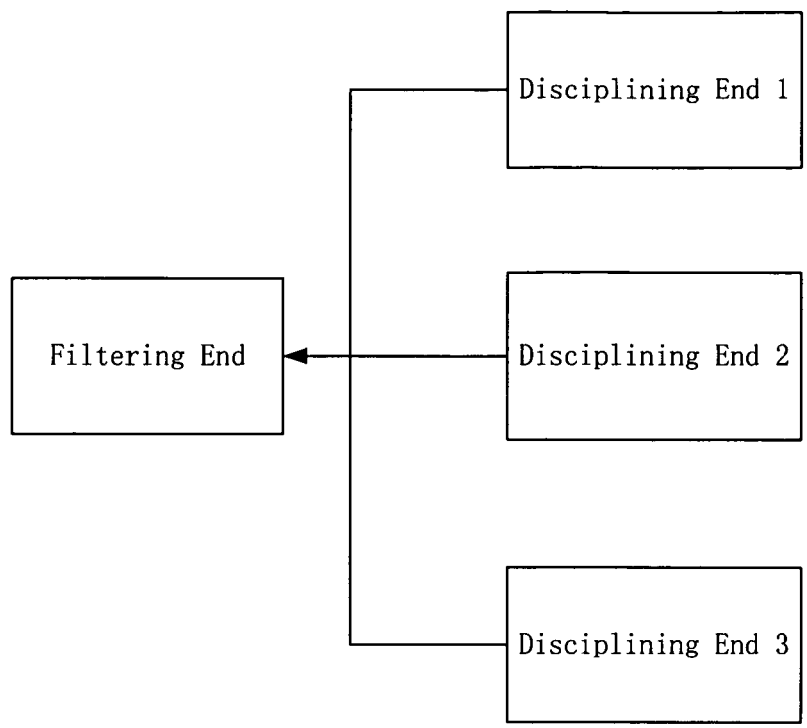
FIG. 3 is a schematic diagram showing the other embodiment of the present invention.
Figure 4:
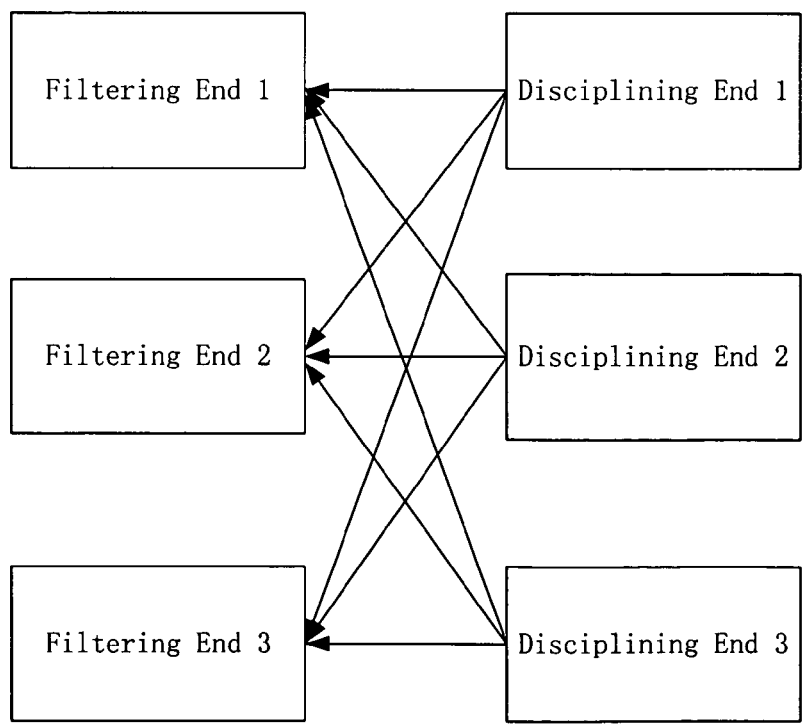
FIG. 4 is a schematic diagram showing another embodiment of the present invention.

As shown in FIG. 2, FIG. 3 and FIG. 4, the system structure of the present invention is a system working mode of the disciplining system and the filtering system separately installed.

According to the definition of the notional model of disciplining-filtering system, a contents filter system is separated as two modules: the disciplining system and the filtering system. The filtering system in the contents filter can be installed in the input device of network information (such as firewall, mail server, proxy server etc.), respond to the identifying request of system content safety, real-time scan the unknown text content, perform the determination of the similarity between the unknown text and the filtering class character according to the character data of filtering class, and obtain the similarity between the unknown text and the filtering class, then make the system to process.

The work mode of the disciplining system and the filtering system separately installed makes the contents filter more flexible. The disciplining system is large and powerful, and all the parameters needed in filtering are generated in the disciplining system; while the filtering system is small and flexible and its processing speed is fast. So it can be installed in multi-type of software systems and hardware systems conveniently.

The filtering system communicates with the disciplining system through the standard data interface; the disciplining system offers support to the filtering system in multi-mode:

The contents filter builds a logic relation with the disciplining system through the character data of filtering class, and they can be separated in physics. User can meet different requirement by means of downloading the character data of standard filtering class from the technical support web station or disciplining itself with the disciplining system software.

The structure of the contents filter can be as follows: one disciplining system supports more filtering systems; or one filtering system supports more disciplining systems or more disciplining systems support more filtering systems.

Figure 5:
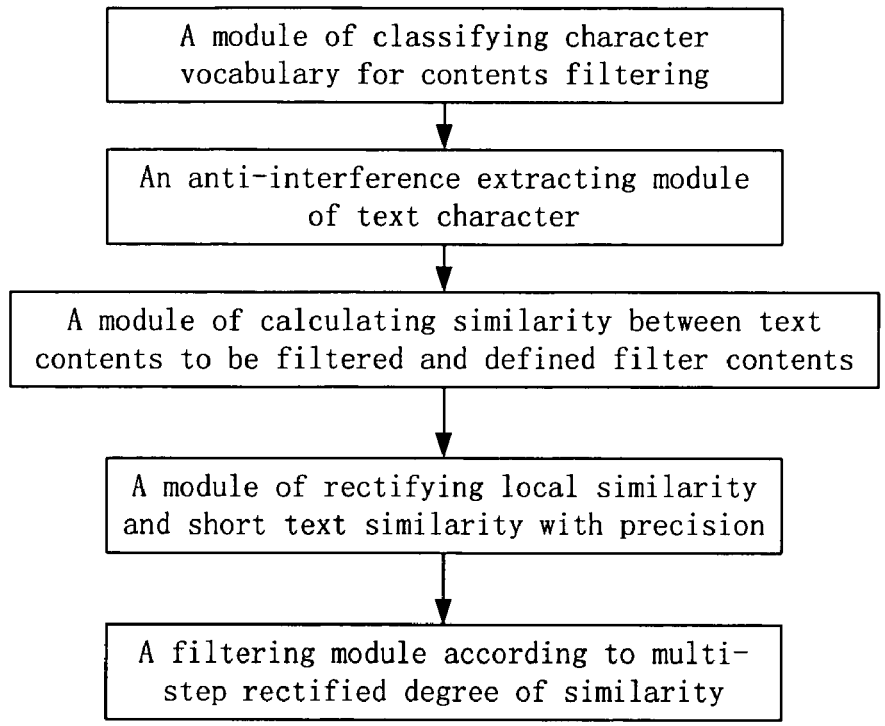
FIG. 5 is a schematic diagram showing the filtering system of the present invention.

Referring to FIG. 5, the disciplining system includes a module of classifying character vocabulary for contents filtering, an anti-interference extracting module of text character, an anti-interference extracting module of text subject matter and an evaluation and instruction module of disciplining effect.

In fact filtering is a procedure of classification, but is stricter than classification. The filtering system defines typical distinguished words as character words, and constructs a classifying character vocabulary used for contents filtering by taking statistic on the text which contains a hundred million words; the vocabulary embodies about 20000 vocabulary entries.

The extraction of text character is to calculate the appearance frequency of character words and so on in text according to the classifying character vocabulary for contents filtering. At present in order to pass the key word filter, some unwelcome network information intentionally is interfered in some important word, such as "□□□" is written as "□#□#□" or "□□□" is written as "□□□□" to make the filter does not function. With respect to the contents filter, the text content character is made weak. According to this situation, the present invention provides an anti-interference extracting method to implement the anti-interference extraction of the text character.

The extraction of text character is based on the classifying character vocabulary for contents filtering, the extracting procedure is the procedure of building the vector of the text character, and is the procedure of the contents filter building up the "filtering knowledge".

Comparing with the text character, the text subject matter more concretely indicates the classification of the text contents, each filtering class will build up the set of the subject matter words during the procedure of disciplining, and it represents the most typical character in the contents.

The technology of evaluation and instruction will give the evaluation of filtering effect and disciplining guidance towards the disciplining effect of user.

Figure 6:
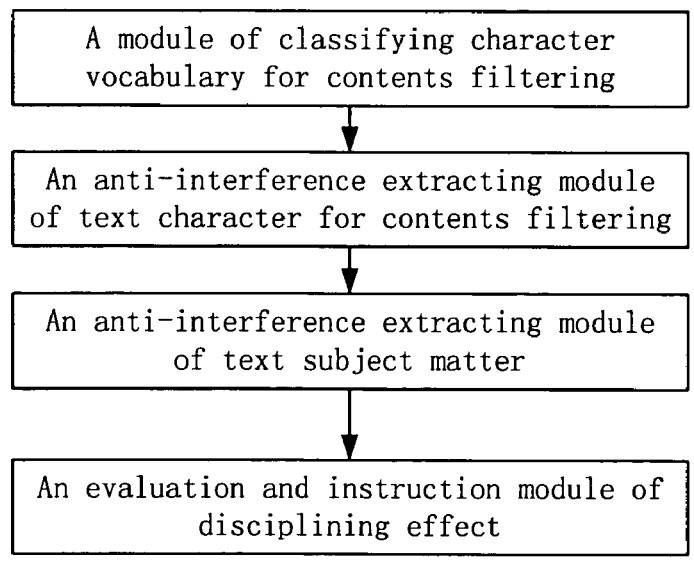
FIG. 6 is a schematic diagram showing the disciplining system of the present invention

See also FIG. 6, the filtering system includes:

1. A classifying character vocabulary for contents filtering;
2. Anti-interference extracting of text character;
3. Calculating similarity between the text contents to be filtered and the defined filtering contents character;

Apply the Vector Space Model to implementation of the contents filter system; perform the calculation of the vector similarity between the text contents to be filtered and the filtering class character.

The standard formula to calculate text similarity based on the Vector Space Model is as follows:

$$Sim(w_i, v_j) = \cos\theta = \frac{\sum_{k=1}^{n} w_{ik} \cdot v_{jk}}{\sqrt{\sum_{k=1}^{n} w_{ik}^2} \cdot \sqrt{\sum_{k=1}^{n} v_{jk}^2}},$$

in this formula, $W_i$, and $V_j$ is the vector of text to be analyzed and the standard vector, $w_{ik}$, and $v_{jk}$ is the part of the vector.

4. Calculating $R_{is}$, the correlation which represents the correlation between the text contents to be filtered and the defined filtering contents subject matter; rectifying the similarity by the correlation of subject matter words.

In each text there are some words, which take particular effect on the property of class, named subject matter words of the text. In the procedure of intelligent classification of human being, the special contribution with these subject matter words will be considered and weighted to text class. The subject matter words are obtained by preset appointing or extracted by the subject matter words extracting arithmetic.

5. Using the rectifying coefficient of precision $P_i$ to rectify local similarity and short text similarity.

6. After obtaining the degree of similarity by multi-step rectification, then whether filtering the text to be filtered is determined according to the preset filtering threshold value $U_w$.

$S_{w,v}$, the degree of similarity by multi-step rectification, is obtained according to the following formula:

$S_{w,v} = Sim(w_i,v_j) \times P_i \times R_{is}$

If $S_{w,v} \geq U_w$, the contents filter will ask the system to filter the text.

If $S_{w,v} < U_w$, the contents filter will consider the text safe and passable.

Figure 7:
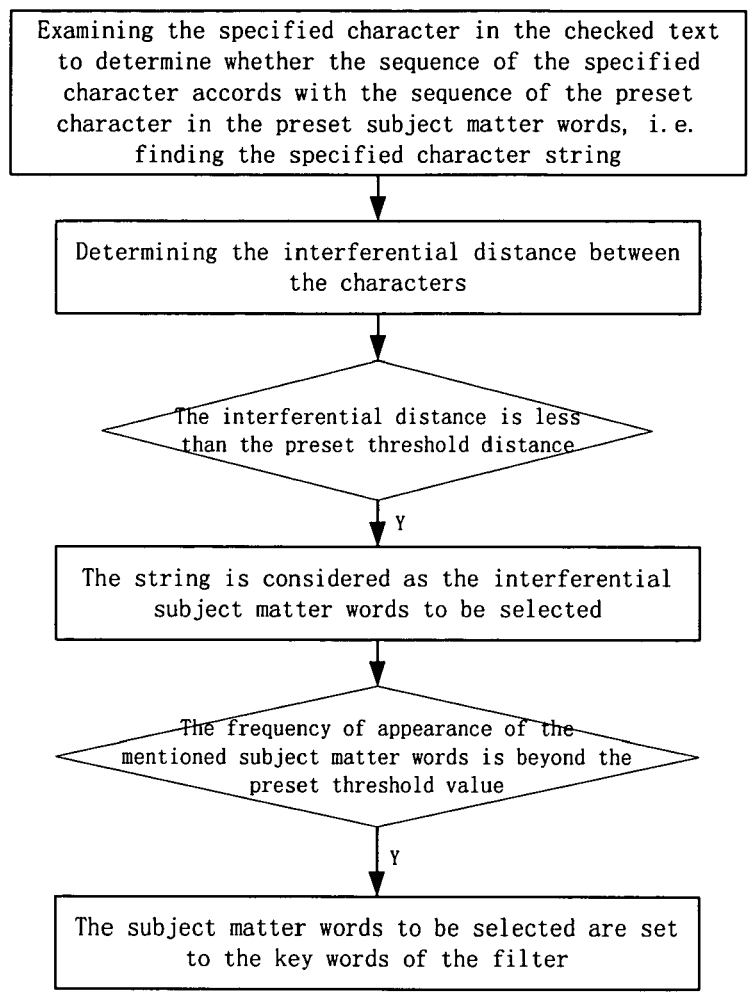
FIG. 7 is a flowchart showing the extraction of the anti-interference subject matter words of the present invention.

As shown in FIG. 7, the subject matter words are the words significant and important on meaning and type for the specified text contents. The subject matter words set is bigger than or equal to the key words set, the subject matter words obtained by anti-interference filtering can be used in the key words filter or other procedures based on the subject matter words.

The subject matter words set of text of specific type can be appointed manually or obtained automatically, the method to obtain them is independent of the present invention.

The method of anti-interference extracting of the subject matter words is as follows:

Considering one subject matter word $W = a_1 a_2 \ldots a_n$, in which $a_1 \ldots a_n$ is the serial sequence character of the subject matter word. During scanning the text S, if $a_1 \in S, a_2 \in S, \ldots a_n \in S$, and $a_1 < a_2 < \ldots < a_n$, and if the number of character between $a_1$ and $a_n$ is less than the preset threshold distance D, and there is no punctuation between $a_1$ and $a_n$, then there is an interferential subject matter word between $a_1$ and $a_n$. Each time finding the word string, accumulate the frequency to be selected of the word as F'(W)++. When F'(W) reaches one preset threshold value $F_0$, all the interferential word strings are considered as the subject matter word W, and the influence is increased at the time of calculating the information of corresponding subject matter word.

Wherein "<" stands for the precedence relation of the sequence (regardless of adjoining).

An embodiment is as follows:

The preset anti-interference distance of the contents filter is equals to 5, the frequency threshold value of interferential word is $F_0=3$.

Text i include the subject matter words S, and S=a1 a2 a3 a4 a5.

According to preliminary analysis, the character string S' is found between two neighboring punctuation:

S'=a1 x a2 x a3 a4 x a5, in which, x stands for any character except punctuation.

Examining the relation between S' and S with the anti-interference rule, there exists a1<a2<a3<a4<a5, and the number of character is 3 between a1 and a5, less than the anti-interference distance D=5, and there are no punctuation between a1 and a5, then the said case fits the condition, so it comes into existence that S' equals to S, S' is considered as one of the subject matter words to be selected in text i. Then, if we found S' or transmutation of S' about location of the interferential character x more than 3 times, then it is concluded that S' is the interferential word of S. i.e., which comes into existence that the frequency of interferential word S F'(S) is larger than the threshold value $F_0$, so through anti-interference processing of the subject matter word, it is considered that S' accords with the subject matter words of text i, and will be treated as the subject matter word in the contents filter.

Figure 8:
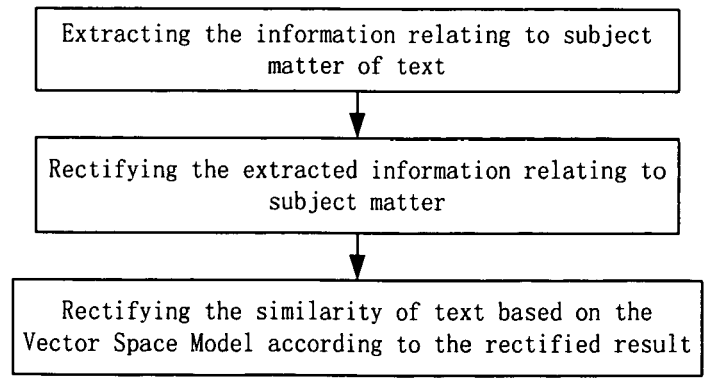
FIG. 8 is a flowchart showing the calculation of degree of text similarity based on the Vector Space Model according to the rectified result of subject matter information of the present invention.

As shown in FIG. 8, the ordinary method of calculating similarity of text based on the vector space is as follows:

$$Sim(w_i, v_j) = \cos\theta = \frac{\sum_{k=1}^{n} w_{ik} \cdot v_{jk}}{\sqrt{\sum_{k=1}^{n} w_{ik}^2} \cdot \sqrt{\sum_{k=1}^{n} v_{jk}^2}}$$

In above formula, Wi, Vj is the vector of text to be analyzed and the standard vector respectively, wik, vjk is the part of the vector. Therefore it is shown that all words are treated equally during the process of calculating similarity of degree.

Besides the character words, there exist some special words in each class of text, they give specific contribution to the class which the text belongs to, these special words are called character words or subject matter words. In the procedure of intelligent classification of human being, the special contribution of these subject matter words will be considered and weighted to text class.

Based on this thought, in order to make result of the similarity more efficient and natural, an extracting method is set according to the subject matter word, and the said standard method is rectified according to the extracted subject matter words.

Before the rectification on the subject matter word, first step is to extract the subject matter words of specific class. Procedure in detail is when analyzing the specific text and extracting the character vector of text, the subject matter words are exacted with overall consideration of the frequency of word, the concentration of frequency and the information of word length. We provide a concrete method as follows:

$$w_{ik} = \left(K_1 + \frac{K_1 \times tf}{MAXtf}\right)^{①} \times \frac{1}{\log_2 \frac{T_w}{tf}}^{②} \times \left(K_2 + K_2 \times \frac{w_l}{MAXw_l}\right)^{③}$$

in which, ☐ stands for the factor of the frequency of word; ☐ stands for the factor of the concentration of frequency; ☐ stands for the factor of word length ☐$W_{ik}$ stands for the weight of the word in text I; tf stands for the frequency of the word k in text i; MAXtf stands for the frequency of the word with maximum frequency; $K_1$ stands for the grade of importance to tf, commonly set to 0.5; $MAX_m$ stands for the maximum value of the word length in the text; $K_2$ stands for the grade of importance to $w_i$, commonly set to 0.5; $T_w$ stands for the amount of total words (considering the character words only).

In the procedure of disciplining, a group of words with maximum value are extracted as the standard subject matter words set, when dealing with the text to be analyzed, the subject matter words set of text to be analyzed is calculated with the formula too, and the subject matter words are rectified according to the said two subject matter word sets.

The embodiment is as follows:

Determining whether one character word W pertains the subject matter words of text i.

Total character words amount in text i is $T_w$☐100, the maximum frequency of word MAXtf is equal to 6, the maximum word length MAX $_{wi}$ is equal to 5, there is a character words W in the text, it's word length $w_i$ is equal to 3, it's frequency tf in text is 5.

Setting $K_1$☐$K_2$☐0.5.

Calculating the weight of the character word W in text i using the subject matter extracting formula, then $$w_{ik} = \left(0.5 + \frac{0.5 \times 5}{6}\right) \times \frac{1}{\log_2 \frac{100}{5}} \times \left(0.5 + 0.5 \times \frac{3}{6}\right) \approx 0.159.$$

Repeating the said steps, the weights of all one hundred character words in text i can be calculated, then all the character words are arranged in weight order. If ten subject matter words in text i are extracted, the maximum top ten character words are chosen as the subject matter words of text, if the weight $w_{ik}$ of the word W meets condition, the word W is namely the subject matter word of text i.

When the similarity of text to be analyzed is calculated☐the subject matter rectifying coefficient is adjusted according to the degree of overlapping of text to be analyzed and the standard subject matter words set based on the thoughts of subject matter rectifying.

The formula for subject matter words rectifying is as follows:

$$R_{is} = A + \frac{T_{is} \cap C_s}{C_s}$$

in which, A is an experience value (0<A<1), generally set to 0.7, which reflects the degree of paid importance to the subject matter word; $R_{is}$ is a correlation coefficient of the subject matter words in range from A to A+1; $T_{is}$ is the subject matter words amount of the text to be analyzed; $C_s$ is the subject matter words amount of standard class. "∩" stands for calculation of intersection, namely determines the amount which $C_s$ contains $T_{is}$, the calculation of intersection is immune from the sequence of the subject matter words.

The coefficient of the subject matter words aims at determining the similarity of contents by the degree of overlapping of the subject matter words. As shown in above formula, as long as the overlapping of the subject matter words reach 1−A, i.e.

$$\frac{T_{is} \cap C_s}{C_s},$$

the ratio of the subject matter words to be analyzed and the standard subject matter words, is larger than 1−A, if $R_{is}$ is more than 1, the similarity of character vector will be strengthened; while on the contrary, if $R_{is}$ is less than 1, the similarity of character vector will be weakened.

The method of the present invention aims at rectifying the similarity of text based on the Vector Space Model by the subject matter words, namely, rectifying the similarity of text based on the Vector Space Model by subject matter words rectification. As follows shows:

The correlation degree between the text to be analyzed and the standard text is equal to $Sim(w_i,v_j) \times R_{is}$, in which $R_{is}$ is a correlation rectifying coefficient of the subject matter words.

An embodiment is:

There is one filtering class T, which has a subject matter words set

Subj_T={$S_1,S_2,S_3,S_4,S_5,S_6,S_7,S_8,S_9,S_{10}$}

The degree of similarity between text i and the filtering class T, which is calculated by the Vector Space Model, is Sim(t,i), and the subject matter words set of text i is obtained through the subject matter words extracting:

Subj_i={$i_1,i_2,i_3,i_4,i_5,i_6,i_7,i_8,i_9,i_{10}$}.

Calculate the intersection of Subj_T and Subj_i, i.e. determine the amount of $S_i$ equaling to $i_k$.

1) If Subj_T∩Subj_i is equal to 7, set A is 0.7, the rectifying value of subject matter words is $$R_{is} = 0.7 + \frac{T_{is} \cap C_s}{C_s} = 0.7 + \frac{7}{10} = 1.4,$$

then the text similarity from VSM model is rectified by $R_{is}$.

The correlation degree of similarity between text i to be analyzed with class T is equal to Sim(i,T)×$R_{is}$☐1.4×Sim(i,T), the similarity of text is rectified to a large value, which shows that the high subject matter correlation degree of text i and the filtering class T increases the degree of text contents.

2) If Subj_T∩Subj_i is equal to 1, set A is 0.7, the rectifying value of subject matter words is $$R_{is} = 0.7 + \frac{T_{is} \cap C_s}{C_s} = 0.7 + \frac{1}{10} = 0.8.$$

The text similarity from VSM model is rectified by $R_{is}$.

The correlation degree of similarity between text i to be analyzed with class T is equal to Sim(i,T)×$R_{is}$☐0.8×Sim(i,T), the similarity of text is rectified to a small value, which shows that the subject matter departure of text i from the filtering class T weakens the degree of text contents.

Figure 9:
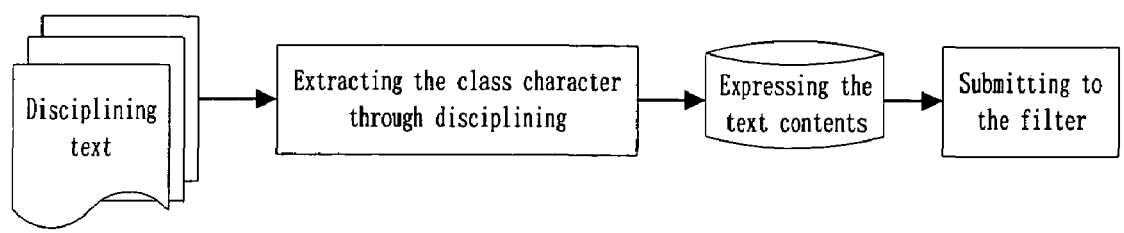
FIG. 9 is a schematic diagram showing the learning processing module of the disciplining system of the present invention.

As shown in FIG. 9, the process of evaluation of disciplining effect includes adopting the appointed disciplining text, extracting the class character through disciplining, then expressing the text contents, finally submitting to the filter to conduct the operation of filtering.

The evaluation of disciplining effect includes three aspects: the evaluation of character words amount, the evaluation of rate of repeat of character words and the evaluation of degree of subject matter centralization. When the quantity of disciplining reaches an amount such as 100K, 200K etc, (the point is called the disciplining evaluation point), according to the coefficient of evaluation enunciated, the result of evaluation of disciplining effect is educed.

In detail, the coefficient of the evaluation of character words amount is obtained as follows:

Because the character words reflect the main contents of linguistic elements, the less the character words amount referring to disciplining text are, the more the centralized linguistic elements are, so a coefficient of character words amount is set.

The character words amount in the disciplining text is $x_i$, the total amount of the character words is A. The threshold value $\alpha_i$ is set according to experience. The formula for $Q_1$: is as follows:

$$Q_1 = \begin{cases} 1 & \text{when } x_i < \alpha_i \\ \dfrac{A - x_i}{A - \alpha_i} & \text{when } x_i > \alpha_i \end{cases}.$$

According to experience, $\alpha_i$ of each evaluation point is as follows:

| Quantity of disciplining: | 100 k | 200 k | 300 k | 400 k |
|---|---|---|---|---|
| $\alpha_i$ | 2500 | 3400 | 4200 | 4800 |

The coefficient of the evaluation of rate of repeat of character words is as follows:

Because the character words reflect the main contents of linguistic elements, so the higher the rate of repeat of character words are in disciplining text, the more centralized linguistic elements are, therefore a coefficient of the evaluation of rate of repeat of character words is set.

If at the disciplining evaluation point of i, the character words is extracted from the disciplining text of group i, and compared with the set of character words from the disciplining text of i-1 groups, the rate of repeat of character words is calculated. If the mean rate of repeat is $x_i$, the experience threshold value is $\beta$, then the formula of $Q_2$ is shown as follows:

$$Q_2 = \begin{cases} x_i/\beta & \text{when } x_i < \beta \\ 1 & \text{when } x_i > \beta \end{cases} \quad \text{let\_( = 0.4}_\circ$$

Furthermore, the coefficient of the evaluation of degree of subject matter centralization is obtained as follows:

If the subject matter of disciplining linguistic elements is relatively centralized, the most linguistic elements will talk about the same topic. According to this thought, a coefficient of the evaluation of degree of subject matter centralization is set.

If at the disciplining evaluation point of i, xi, the maximum document overlapping rate of the top n of high frequency character words is extracted from the disciplining linguistic elements of the group i, and the experience threshold value ( is set, The formula of Q3 is shown as follows:

$$\text{EMBED} \qquad \text{Equation. 3}$$

The experience value is: (=0.8, n=50.
Finally the formula of disciplining effect is:

$Q=Q1*Q2*Q3$ or $Q=Q1*Q2$ or $Q=Q1*Q3$ or $Q=Q1$ or $Q=Q2$ or $Q=Q3$

Accord to the value of Q, the grade of disciplining effect is determined.

Q□ 0-0.2 0.2-0.4 0.4-0.6 0.6-0.8 0.8-1.0

Grade of effect: worst bad normal good best.

According as the said result can conduct the disciplining system of the filter better so as to improve the disciplining effect.

Comparison with concrete examples is shown as follows:

To some kinds of disciplining text which has high degree of concentration, accompanying with extracting some farraginous texts from one multipurpose network to be contrast in this example of experiment, the said method is used to verify the effect of disciplining. The result is shown as follows:

Effect of the texts with better concentration:

| Quantity of disciplining: | 100 k | 200 k | 300 k | 400 k |
|---|---|---|---|---|
| $Q_1$ | 1 | 1 | 1 | 1 |
| $Q_2$ | 1 | 1 | 1 | 1 |
| $Q_3$ | 1 | 1 | 1 | 1 |
| Q | 1 | 1 | 1 | 1 |

Effect of a group of texts with farraginous:

| Quantity of disciplining: | 100 k | 200 k | 300 k | 400 k |
|---|---|---|---|---|
| $Q_1$ | 0.95 | 0.9 | 0.86 | 0.85 |
| $Q_2$ | 1 | 0.8 | 0.7 | 0.75 |
| $Q_3$ | 0.85 | 0.67 | 0.65 | 0.35 |
| Q | 0.80 | 0.48 | 0.39 | 0.22 |

Obviously the disciplining effect of farraginous text is far from the effect of the present invention.

The concept of Space of Vector Model is that the text is considered as a group of vocabulary entry, each of them is set with a tantamount weight according to the importance of each vocabulary entry. Then a vector space is constructed, each text can be expressed as a Vector Space Model which consists of a vocabulary entry and a weight, as shown in follows:

$TW=((t_1,w_1),(t_2,w_2),\ldots,(t_n,w_n))$

Consequently the problem of matching of text contents is transformed to the calculation of vector correlation in vector space.

The standard formula of similarity of text based on Space of Vector Model is shown as follows:

$$Sim(w_i, v_j) = \cos\theta = \frac{\sum_{k=1}^{n} w_{ik} \cdot v_{jk}}{\sqrt{\sum_{k=1}^{n} w_{ik}^2} \cdot \sqrt{\sum_{k=1}^{n} v_{jk}^2}}$$

in which, $W_i$, $V_j$ is the text vector to be analyzed and the standard vector separately, $w_{ik}$, $v_{jk}$ is the part of each corresponding vector. The said formula's function is to calculate the of similarity of $W_i$ and $Vj$.

In practice, there exists in this formula such problem as follows: the text to be analyzed, which does not belong to class $V_j$, maybe obtain a higher similarity because of containing the part of high weight words of the standard vector $V_j$. This is abnormal and is also the defect of this method. This case will be especially outstanding when the text to be analyzed contains few character words but the character words with high weight.

In the process of intelligent classifying, the text to be analyzed will be not classified to $V_j$ because of containing some high weight words, but the similarity of text of this kind will be reduced.

Therefore, a method for rectification based on precision of similarity is involved to make the result be more effective and involuntary. This method is shown as follows:

The correlation degree between the text i to be analyzed and the standard text is equal to $Sim(w_i, v_j)_{\times Pi}$ in which, $P_i$ stands for the rectifying coefficient of precision.

The concept of precision is as follows:

$P_i$ is a degree data, which presents how much precision the text to be analyzed belongs to the standard class, called precision (of similarity).

The formula to calculate is shown as follows:

$$P_i = B\sqrt{\frac{\sum(\sigma_k v_{jk})^2}{\sum(v_{jk})^2}}$$

in which $B \geq 1$ and $\sigma_k = \begin{cases} 1 & \text{when } w_{jk} > 0 \\ 0 & \text{when } w_{jk} = 0 \end{cases}$ B is an experience value, which stands for the importance to the information of precision. When $P_i$ is more than 1, the similarity of character vector is strengthened; on the contrary the similarity of character vector is weakened.

An embodiment is shown as follows:

A kind of text T can be present by $T=\{(t_1,100),(t_2,100),(t_3,50),(t_4,50),(t_5,10),\ldots,(t_{20},10)\}$, (in which, $t_i$ is the character words).

A text to be analyzed, M, after processing we obtain the character vector model of it as follows: $M=\{(t_i,100),(t_2,100)\}$.

According to the vector M to be analyzed, the vector T of text of classification is rectified, by the calculation of text similarity in Space of Vector Model we obtain: $Sim(T,M)=0.87$;

Ostensibly the text M and T is high similarity according to the result, while actually the text M only reflects the local part of class T, just local part is highly similar. When calculating the similarity in Space of Vector Model, the problems of local similarity and short text similarity can be solved. But it is unnatural that the similarity is increased by a few high weight words.

Add the rectification of precision, let B equal to 1, then $P_i$ is equal to 0.8, the similarity is more reduced, the result is more involuntary. This method especially has more influence near the threshold value which is used to determine the class belonged to, and make some text whose similarity is a little higher than the threshold value to be reduced similarity below the threshold value.

The invention claimed is:

1. A contents filter based on similarity of content character and correlation of subject matter, which is characterized in that the contents filter includes at least a filtering system and a disciplining system wherein said filtering system and the disciplining system are installed physically separately, and the filtering system is installed in at least one input device of network information and communicates with the disciplining system through a data interface;

the disciplining system learns with appointed information to obtain filtering characters of said appointed information;

the filtering system filters said appointed information, and the disciplining system communicates with the filtering system;

said disciplining system includes an anti-interference extracting module of text character for contents filtering, the module finds a specified text information in a checked text to determine whether a sequence of the specified text contents is in accord with a sequence of a preset text wherein different filtering characters that are obtained by the disciplining system are configured to filtering systems located in different input devices of network information; and thereby determines an interferential distance between the specified text information and the checked text, if the interferential distance is less than a preset threshold, the checked text contents are set as the interferential text contents to be selected, wherein said configuration is to distribute the filtering character of the filtering system according to burden capacity, location and purpose of the input device of network information in network.

2. The contents filter based on similarity of content character and correlation of subject matter according to claim 1 wherein said contents filter includes one disciplining system and one or more filtering systems.

3. The contents filter based on similarity of content character and correlation of subject matter according to claim 1 wherein said contents filter includes one filtering system and one or more disciplining systems.

4. The contents filter based on similarity of content character and correlation of subject matter according to claim 1 wherein said contents filter includes one or more filtering systems and one or more disciplining systems.

5. The contents filter based on similarity of content character and correlation of subject matter according to claim 1 wherein said input device of network information is a firewall.

6. The contents filter based on similarity of content character and correlation of subject matter according to claim 1 wherein said input device of network information is a mail server.

7. The contents filter based on similarity of content character and correlation of subject matter according to claim 1 wherein said input device of network information is a proxy server.

8. The contents filter based on similarity of content character and correlation of subject matter according to claim 1 wherein said input device of network information is a personal computer.

9. The contents filter based on similarity of content character and correlation of subject matter according to claim 1 wherein said input device of network information is at least one of an input device of network information, and multiple input devices of network information.

10. The contents filter based on similarity of content character and correlation of subject matter according to claim 1 wherein said disciplining system includes a module of classifying character vocabulary for contents filtering, which is used to construct a classifying character vocabulary learned from special information, and to conduct the supplement or update of the filtering system.

11. The contents filter based on similarity of content character and correlation of subject matter according to claim 1 wherein said disciplining system further includes an anti-interference extracting module of text subject matter.

12. The contents filter based on similarity of content character and correlation of subject matter according to claim 11 wherein a procedure of said anti-interference extracting module of text subject matter extracting the anti-interference subject matter words includes the following steps:
    (A) the anti-interference extracting module of text subject matter examines specified characters in a checked text, to determine whether the sequence of the specified characters accords with the sequence of the characters in the preset subject matter words, i.e. finding a specified character string;
    (B) the anti-interference extracting module of text subject matter determines interferential distance, if the interferential distance is less than a preset threshold distance, the string is considered as a interferential subject matter words to be selected; and
    (C) while the anti-interference extracting module of text subject matter concludes that the frequency of appearance of the mentioned subject matter words is beyond the preset threshold value, the subject matter words to be selected are set to a key words of the filter.

13. The contents filter based on similarity of content character and correlation of subject matter according to claim 12 wherein said anti-interference extracting module of text subject matter examining the specified characters further includes finding whether the specified characters contain Chinese punctuation among them, if the specified characters don't contain Chinese punctuations, the character string is considered as the interferential subject matter words, and the anti-interference extracting module of text subject matter sets the character string as the key words of the filter.

14. The contents filter based on similarity of content character and correlation of subject matter according to claim 12 wherein said step (A) is directly implemented as follows: the anti-interference extracting module of text subject matter examines the specified character string between two adjacent punctuations.

15. The contents filter based on similarity of content character and correlation of subject matter according to claim 12 wherein said frequency of appearance of the interferential subject matter word to be selected is a summation of the interferential subject matter words of different types.

16. The contents filter based on similarity of content character and correlation of subject matter according to claim 12 wherein said anti-interference extracting module of text subject matter is used to extract information relating to text subject matter, and rectify the extracted information, then rectify the similarity of text based on a Vector Space Model with the rectified result of the subject matter information.

17. The contents filter based on similarity of content character and correlation of subject matter according to claim 16 wherein rectifying the similarity of text based on the vector space according to the rectified result of the subject matter information includes the following steps:
    (A) the anti-interference extracting module of text subject matter extracts the information relating to subject matter of text;
    (B) the anti-interference extracting module of text subject matter rectifies the result of similarity of text based on the Vector Space Model.

18. The contents filter based on similarity of content character and correlation of subject matter according to claim 17 wherein before said step (B), the steps further include: rectifying the extracted information relating to subject matter, then rectifying the similarity of text based on the Vector Space Model.

19. The contents filter based on similarity of content character and correlation of subject matter according to claim 18 wherein the rectification of the similarity of text based on the Vector Space Model comprises: if the degree of overlapping is more than a threshold value, the value of eigenvector similarity is strengthened, and if the degree of overlapping is less than the threshold value, the value of eigenvector similarity is weakened.

20. The contents filter based on similarity of content character and correlation of subject matter according to claim 19 wherein the rectification of the similarity of text based on the Vector Space Model is: $Sim(w_i,v_j) \times R_{is}$, in which, $Sim(w_i,v_j)$ is the similarity of text based on the Vector Space Model, $R_{is}$ a correlation coefficient of the subject matter word.

21. The contents filter based on similarity of content character and correlation of subject matter according to claim 18 wherein the rectification of the information relating to subject matter is performed with the following formula:

$$R_{is} = A + \frac{T_{is} \cap C_s}{C_s}$$

wherein A is an experiential value reflecting the degree of paid importance to the subject matter word($0<A<1$), $R_{is}$ is a correlation coefficient of the subject matter word; $T_{is}$ the subject matter words amount of the text to be analyzed; $C_s$ is the subject matter words amount of standard class, "∩" stands for calculation of intersection.

22. The contents filter based on similarity of content character and correlation of subject matter according to claim 17 wherein said information relating to text subject matter extracted by said anti-interference extracting module of text subject matter in step (A) is a frequency of word, a concentration of frequency, a information of word length, words, and the total word amount; and the information relating to subject matter is information relating to subject matter with top weight after weighting.

23. The contents filter based on similarity of content character and correlation of subject matter according to claim 22 wherein extracting of the information relating to subject matter by the anti-interference extracting module of text subject matter is performed with the formula as follows:

$$w_{ik} = \left(K_1 + \frac{K_1 \times tf}{MAXtf}\right)^{①} \times \frac{1}{\log_2 \frac{T_w}{tf}}^{②} \times \left(K_2 + K_2 \times \frac{w_l}{MAXw_l}\right)^{③}$$

wherein (1) stands for the factor of frequency of word; (2) stands for the factor of the concentration of frequency; (3) stands for the factor of word length; $w_{ik}$ stands for the weight of the word in the text i; tf stands for the frequency of word k in the text i; MAXtf stands for the word frequency of the word with maximum frequency; $K_1$ stands for the grade of importance to tf, commonly set to 0.5; $MAX_{wi}$ stands for the maximum value of the word length in the text; $K_2$ stands for the grade of importance to $w_i$, commonly set to 0.5; $T_w$ stands for the amount of words which only include character words.

24. The contents filter based on similarity of content character and correlation of subject matter according to claim 22 wherein the anti-interference extracting module of text subject matter rectifying the extracted information relating to subject matter is the similarity of contents being determined by the degree of overlap of subject matter information.

25. The contents filter based on similarity of content character and correlation of subject matter according to claim 17 wherein said information relating to subject matter is the subject matter words or the character words.

26. The contents filter based on similarity of content character and correlation of subject matter according to claim 1 wherein said disciplining system further includes an evaluation and instruction module of disciplining effect.

27. The contents filter based on similarity of content character and correlation of subject matter according to claim 26 wherein said evaluation and instruction module of disciplining effect is used to obtain the coefficients of the evaluation of the character word amount, the evaluation of the rate of repeat and the evaluation of the degree of subject matter centralization, then according to these coefficients, the result of disciplining effect is educed to give an objective and quantitative instruction to disciplining.

28. The contents filter based on similarity of content character and correlation of subject matter according to claim 27 wherein the evaluation of the rate of repeat is executed according to the following formula:

$$Q_2 = \begin{cases} x_i/\beta & \text{when } x_i < \beta \\ 1 & \text{when } x_i > \beta \end{cases}$$

in which, $x_i$, stands for the mean rate of repeat, $\beta$ is an experiential threshold value.

29. The contents filter based on similarity of content character and correlation of subject matter according to claim 27 wherein the evaluation of the degree of subject matter centralization is executed according to the following formula:

$$Q_3 = \begin{cases} x_i/\chi & \text{when } x_i < \chi \\ 1 & \text{when } x_i > \chi \end{cases}$$

in which, $x_i$ stands for the maximum overlapping rate of document, $\chi$ is an experiential threshold value.

30. The contents filter based on similarity of content character and correlation of subject matter according to claim 26 wherein the evaluation of the character words amount is executed according to the following formula:

$$Q_1 = \begin{cases} 1 & \text{when } x_i < \alpha_i \\ \frac{A - x_i}{A - \alpha_i} & \text{when } x_i > \alpha_i \end{cases}$$

wherein xi stands for the character words in text of disciplining, A stands for the total amount of the character words, $\alpha_i$ is an experiential threshold value of the character words amount for each disciplining evaluation point.

31. The contents filter based on similarity of content character and correlation of subject matter according to claim 30 wherein the evaluation of disciplining effect is executed according to the following formula:

Q=Q1*Q2*Q3 or Q=Q1*Q2 or Q=Q1*Q3 or Q=Q1 or Q=Q2 or Q=Q3, then according to the value of Q, the grade of disciplining effect is determined.

32. The contents filter based on similarity of content character and correlation of subject matter according to claim 1 wherein said filtering system includes a module of classifying character vocabulary for contents filtering, an anti-interference exacting module of text character, and a module of calculating similarity between text contents to be filtered and defined filtering contents.

33. The contents filter based on similarity of content character and correlation of subject matter according to claim 1 wherein said filtering system includes a module of rectifying local similarity and short text similarity with precision.

34. The contents filter based on similarity of content character and correlation of subject matter according to claim 33 wherein said module of rectifying local similarity and short text similarity with precision is used to obtain precision of relegation of standard class which text to be analyzed belongs to according to the standard vector of text to be analyzed, and use said precision to rectify the result of the similarity of text based on the Vector Space Model.

35. The contents filter based on similarity of content character and correlation of subject matter according to claims 34 wherein said rectification can be $Sim(w_i,v_j) \times P_i$, in which $P_i$ stands for the rectifying coefficient of precision, $Sim(w_i,v_j)$ is the similarity of text based on the Vector Space Model.

36. The contents filter based on similarity of content character and correlation of subject matter according to claim 35 wherein the rectifying coefficient of precision can be obtained through the following formula:

$$P_i = B \sqrt{\frac{\sum (\sigma_k v_{jk})^2}{\sum (v_{jk})^2}}$$

in which $B \geq 1$ and $$\sigma_k = \begin{cases} 1 & \text{when } w_{jk} > 0 \\ 0 & \text{when } w_{jk} = 0 \end{cases},$$

B is an experienced value of the grade of importance to the precision information.

37. The contents filter based on similarity of content character and correlation of subject matter according to claim 1 wherein said filtering system includes a filtering module according to multi-step rectified degree of similarity.

38. The contents filter based on similarity of content character and correlation of subject matter according to claim 37 wherein said filtering module according to multi-step rectified degree of similarity is used to gather the coefficients of precision obtained by each module, with the preset filtering threshold value $U_w$ to determine whether the text to be filtered should be filtered.

39. A contents filter based on similarity of content character and correlation of subject matter, which is characterized in that the contents filter includes at least a filtering system and a disciplining system; the disciplining system learns with appointed information to obtain filtering characters of said appointed information; the filtering system filters said appointed information, and the disciplining system communicates with the filtering system wherein said disciplining system further includes an evaluation and instruction module of disciplining effect and said evaluation and instruction module of disciplining effect is used to obtain the coefficients of the evaluation of the character words amount, the evaluation of the rate of repeat and the evaluation of the degree of subject matter centralization, then according to these coefficients, the result of disciplining effect is educed to give an objective and quantitative instruction to disciplining.

40. A contents filter based on similarity of content character and correlation of subject matter, which is characterized in that the contents filter includes at least a filtering system and a disciplining system; the disciplining system learns with appointed information to obtain filtering characters of said appointed information; the filtering system filters said appointed information, and the disciplining system communicates with the filtering system wherein said filtering system includes a module of rectifying local similarity and short text similarity with precision.

41. A contents filter based on similarity of content character and correlation of subject matter, which is characterized in that the contents filter includes at least a filtering system and a disciplining system; the disciplining system learns with appointed information to obtain filtering characters of said appointed information; the filtering system filters said appointed information, and the disciplining system communicates with the filtering system wherein said filtering system includes a filtering module according to multi-step rectified degree of similarity.

\* \* \* \* \*